March 19, 1935. T. NAKANE 1,994,587
FLEXIBLE HOSE
Filed Sept. 26, 1932
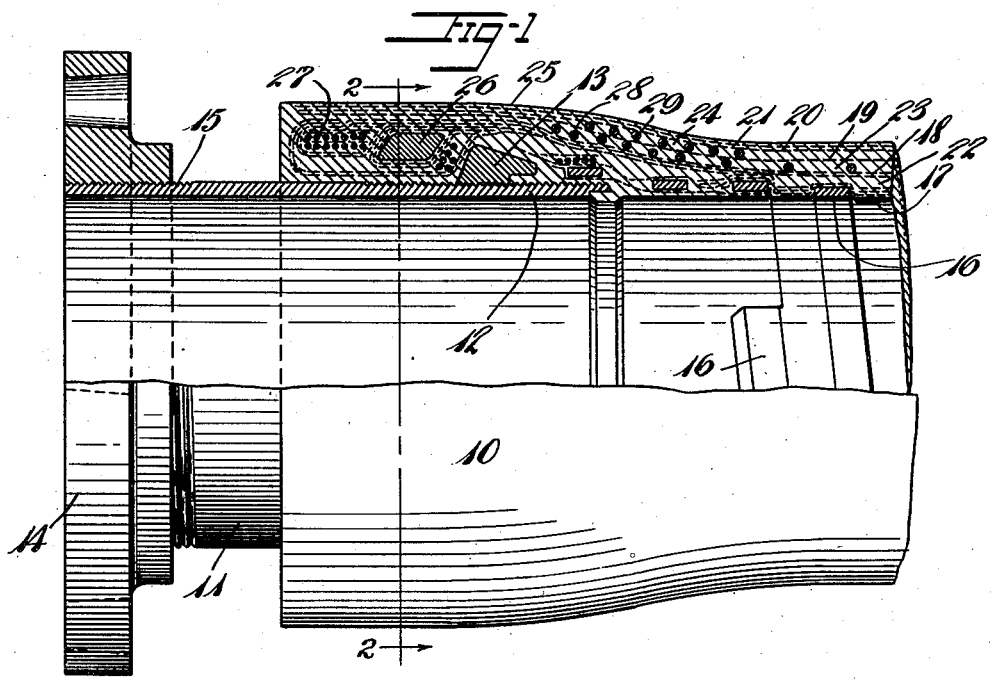
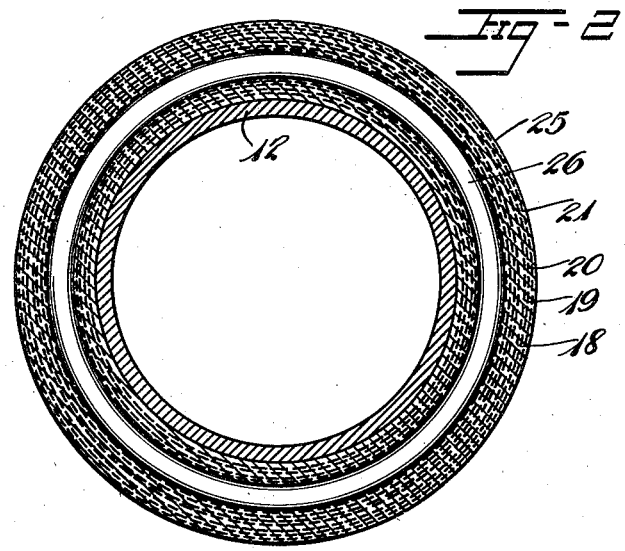
Inventor
TAKASHI NAKANE
By Eskin & Avery
Attys.

Patented Mar. 19, 1935

1,994,587

UNITED STATES PATENT OFFICE 1,994,587

FLEXIBLE HOSE

Takashi Nakane, Yokohama, Japan, assignor to The B. F. Goodrich Company, New York, N. Y., a corporation of New York Application September 26, 1932, Serial No. 634,919

6 Claims. (Cl. 285—80)

This invention relates to flexible hose and more especially to hose provided with a metallic sleeve or nipple whereby it may be connected to metallic pipe or other rigid structures.

The principal objects of the invention are to provide maximum security and strength, neatness in appearance and simplicity of construction.

Other objects will appear from the following description and the accompanying drawing.

In the drawing:

Fig. 1 is a side elevation of an end of a section of hose, parts being broken away to show the construction in section.

Fig. 2 is a cross-section of the hose on line 2—2 of Fig. 1.

Referring to the drawing, the numeral 10 designates the hose and the numeral 11 a nipple formed of metallic pipe. The nipple is provided with a long threaded portion 12 on which a correspondingly threaded ring 13 is secured. A coupling flange 14 may be secured to the exposed end of the nipple which is provided with a standard pipe thread 15.

The hose 10 may be of any well known laminated construction, that shown being of a type used for suction dredging, rotary drillers and similar service where non-collapsing hose of large cross-section is used.

As shown, the hose comprises a layer of helically coiled flat spring wire 16 over which are plies of rubber frictioned fabric 17, 18, 19, 20 and 21 and intervening layers of rubber or other suitable composition, 22, 23, and 24, all enclosed in a rubber cover 25.

Some of the plies of fabric or other reinforcing material extend over the ring 13 and under one or more anchoring grommets 26 and 27 and are cuffed back over the grommets, the cuffed back portions overlying the original plies and being secured thereto by cement or by lashings of wire or cords 28 and 29 applied thereto.

As the grommets 26 and 27 are made smaller in internal circumference than the outer circumference of the ring 13 and substantially inextensible the hose is securely locked over the nipple. The grommet 26 is shown as a solid metallic ring and the grommet 27 comprises a winding of wire or cord, it being understood that either or both types of grommets may be used.

In the manufacture of a section of hose, the nipple 11 is secured upon the end of a mandrel of sufficient length to support the length of hose, the ring 13 being in place and the flange 14 being removed. The wire 16 is wound on the mandrel, extending over the nipple 11. Plies of frictioned fabric 17 and rubber material 22 are then applied over the wire, the rubber extending over the ring 13 and cemented thereto.

Further plies of reinforcing fabric or similar material 18 are then applied so as to extend well beyond the end of the finished hose.

Where solid grommet rings such as 26 are used these may now be slipped in place over the extending plies, or grommets of wire or cord such as 27 may be formed in place by winding the wire or cord upon the plies. The extended ends of the plies are then cuffed back over the grommets and cemented in place or bound in place by lashings of wire or cord 28 and 29.

Other layers of material 21 and the rubber covering 25 may then be applied and the hose vulcanized in the usual manner.

I claim:

1. The combination of a rigid metal sleeve member and a flexible hose connected thereto, said sleve having a ring on its outer surface, and said hose comprising laminations of reinforcing material which extend over said ring and are cuffed back in adhesive engagement with themselves to engage, in a cuffed portion of their margins, a grommet smaller in internal diameter than the external diameter of said ring.

2. The combination of a rigid metal sleeve member and a flexible hose connected thereto, said sleeve having a removable ring member rigidly mounted on its outer surface against longitudinal displacement, and said hose comprising laminations of reinforcing material which extend over said ring member, the extending margins of reinforcing material being cuffed back in adhesive engagement with themselves to engage a grommet smaller in internal diameter than the external diameter of said ring.

3. The combination of a rigid metal sleeve member and a flexible hose connected thereto, said sleeve being threaded to retain a ring mounted on its outer surface, and said hose comprising laminations of reinforcing material which extend over said ring, the extending margins of reinforcing material being anchored about a grommet of such size as to be restrained from passing over said ring, the reversed margins of reinforcing material being adhered to the body of the material.

4. The combination of a rigid metal sleeve member and a flexible hose connected thereto, said sleeve member being provided with an annular projection on a surface thereof and said hose comprising laminations of reinforcing material which extend past said annular projection in cuffed relation so as to be adhered to themselves and engage about a grommet member of such dimensions as to retain the hose in contact with the sleeve and prevent its separation therefrom.

5. The combination of a rigid metal sleeve member and a flexible hose connected thereto, said sleeve member being provided with an annular projection on its outer surface, and said hose comprising laminations of reinforcing material extending over said annular projection and under a solid ring member, the margins of material beyond the ring member being cuffed thereover and adhered to themselves to retain said ring.

6. The combination of a rigid metal sleeve member and a flexible hose connected thereto, said sleeve member being provided with an annular projection on its outer surface, and said hose comprising laminations of reinforcing material extending over said annular projection and under a grommet formed of material wound thereon, the margins of reinforcing material extending beyond said grommet being cuffed thereover and adhered to themselves to retain said grommet.

TAKASHI NAKANE.